United States Patent Office 2,854,437
Patented Sept. 30, 1958

2,854,437

SULFONATED UREA-THIOUREA FORMALDE-
HYDE RESINS

Raymond Polansky and William Frank Herbes, Somer-
ville, N. J., assignors to American Cyanamid Company,
New York, N. Y., a corporation of Maine.

No Drawing. Application April 30, 1956
Serial No. 581,366

18 Claims. (Cl. 260—70)

The present invention relates to water-soluble hydrophilic mixed resins, derived from thiourea and urea, and more particularly to bisulfite modified urea-thiourea formaldehyde resins which are partially alkylated and partially polymerized. Further, the present invention relates to the preparation of such resins and to their use as flame-resistant materials for textile fabrics and particularly for nylon nettings.

An object of the present invention is to provide a process for preparing improved hydrophilic bisulfite modified urea-thiourea formaldehyde resins which are partially alkylated and partially polymerized.

Another object of the present invention is to provide a hydrophilic bisulfite modified urea-thiourea formaldehyde resin that is partially alkylated and partially polymerized having improved stability against hydrophobing and crystallization or floc formation.

A further object is to provide a process for the manufacture of a stable resin mixture of the type referred to above.

A still further object is to provide a process for treating textile fabrics and in particular nylon mesh netting with said resins whereby a good "hand" and good flame-resistant properties are imparted thereto.

These and other objects and advantages will become apparent from the detailed description set forth hereinbelow.

According to the present invention, an aldehyde and urea are reacted in mole ratios of from 2.0 to 6.5:1, respectively, and preferably 2.5 to 3.0:1, respectively, in the presence of bisulfites at a pH of between 7.0 and 9.0, and preferably at a pH between 8.0 and 8.5

The aldehyde used therein may be selected from a wide variety of water-soluble aldehydes, including formaldehyde, acetaldehyde, propionaldehyde, glyoxol, and the like. Formaldehyde is preferred for the purpose of the present process, either as a formalin solution or in its more concentrated forms, such as paraformaldehyde. It is sometimes preferred in its concentrated form, as when it is desirable to minimize the amount of water introduced into the system when a concentrated final product is sought.

The bisulfite is preferably $NaHSO_3$, but may be one of a number of bisulfites, including bisulfites per se, sulfites which yield bisulfite, under the resin-forming reaction conditions of the present invention or mixtures of such sulfites and bisulfites. The bisulfite is added to the reaction mixture so as to be present in a mole ratio of from 0.01 to 0.040 mole of said bisulfite per mole of aldehyde and preferably in a mole ratio of from 0.030 to 0.038 mole per mole of aldehyde.

Thereafter, the charge is reacted at temperatures between 45° C. and 105° C. for from about 20 to about 120 minutes and preferably for from about 45 to 75 minutes. Reflux temperatures of from between about 95° C. and about 105° C. are preferred. At the end of this period, the pH is adjusted to from 2.2 to 3.8 and preferably to between about 3.0 and 3.6 by the addition of formic, oxalic, or other suitable acid or acid-acting materials.

As noted above, the mixture is heated for from about 20 minutes to about 120 minutes. When the reaction mixture is heated for periods of time of less than 20 minutes, the resultant product, though initially a clear solution, will subsequently shed down floc, cloud or haze, indicating a lack of stability. This is believed to be the result of under-reacting or under-methylolating. When the reaction mixture is heated for periods of time over the 120-minute upper limit, the resultant product hydrophobes. The time limitations set forth are for the most part arrived at through empirical determinations.

Temperatures lower than 45° C. may be employed, but this would require additional periods of time and results to some extent in an inferior product. By empirical determination, suitable times for given amounts of starting materials, temperature, etc. may be readily arrived at. The same is true for temperatures in excess of reflux in which pressure is employed. Thus, higher temperatures, generally speaking, would require shorter periods of time to prepare the product having the desired characteristics.

After the pH of the reaction mixture has been adjusted to from 2.2 to 3.8, the mixture is then polymerized within the temperature range indicated and preferably at from 95 to 105° C. for from about 10 minutes to about 120 minutes and preferably for about 20 to 75 minutes until the reaction mixture is stable and does not cloud or haze upon standing and does not hydrophobe when diluted with 50 volumes of water at 25° C. Thereafter, the pH of the reaction mixture is adjusted to between 7 and 9 and preferably to between 7 and 8, with caustic soda, triethanolamine or the like and from 0.3 to 4 moles and preferably from 1 to 3 moles of saturated monohydric aliphatic alcohol containing from 1 to 3 carbon atoms is added.

Preferably, before the addition of the alcohol, the reaction mixture or charge is cooled to between about 40 and 80° C. and preferably to between 60 and 70° C. in order to avoid volatilization of these alcohols. Among the suitable alcohols which may be employed are methanol, ethanol, propanol and isopropanol, as well as mixtures of two or more of these alcohols. Higher alcohols, generally speaking, are unsatisfactory, since they decrease the hydrophilic characteristics of the resin of the present invention. Methanol is preferred for use in that the hydrophilic characteristics of the resin are best protected by its use and in addition it is relatively inexpensive and readily available.

To the reaction mixture to which the monohydric aliphatic alcohol has been added, between 0.3 and 2.5 moles and preferably between .5 and 1 moles of thiourea are charged and the temperature is adjusted to from between 40 and 65° C. and preferably to between 45° C. and 55° C., where it is maintained for from about 20 minutes to about 120 minutes and preferably for from 45 to 75 minutes. Under these conditions, the thiourea is methylolated. It has been determined that when the temperature goes significantly below 40° C. the reaction proceeds slowly and results in a somewhat inferior product. When temperatures in excess of 65° C. are employed, the dangers of excessive polymerization and possible partial decomposition are encountered and should be avoided. Within the disclosed temperature range, reaction times of less than about 20 minutes will normally result in a product having poor stability. This results in cloudiness, hazing or crystallization occurring therein, producing an unsatisfactory product. Times in excess of the upper limit of two hours result in over-polymerization of components in the reaction mixture and consequent hydrophobing.

The pH of the reaction mixture is then adjusted to between pH 3.5 and 5.5 and preferably to between 4.8 and 5.2, while a reaction mixture temperature of from between 40 and 65° C. and preferably between 45 and 55° C. is maintained for from about 20 minutes to about 2 hours. During this time, both the methylol urea and the methylol condensate of thiourea are at least partially alkylated, but the degree of polymerization of the final product is only slightly increased.

When a substantial portion of the alcohol has been reacted or combined (i. e. an amount equal to at least about 0.15 mole or more per mole of combined formaldehyde) and before hydrophobing occurs the pH of the reaction mixture is adjusted to between 7 and 9 and preferably to between 7.5 and 8.5 by the addition of caustic or other alkali or alkali-acting materials in order to stabilize the reaction mixture and prevent additional polymerization. Thereafter, the reaction mixture is preferably cooled to between 30° C. and 40° C., clarified through a pressure filter or other suitable device and the filtrate may be concentrated under vacuum, as for example to 80% solids.

While the above-disclosed method of preparing the resin of the present invention represents a preferred procedure, it will be a readily apparent that the resinous product may be produced by a number of different procedures. For example, the urea and thiourea may be methylolated independently, and then subsequently mixed before alkylation or they may be methylolated independently, alkylated independently, partially polymerized independently, and thereafter mixed. In addition, it should be evident from the examples that the various components used in the production of the resin of the present invention, according to the above-disclosed process may be added in increments during various phases of the process. Thus, for example, alcohol may be present initially when the urea is being methylolated and subsequent additions may be made during the practice of the process to insure complete alkylation. As a second example of incremental addition, the formaldehyde may be added in at least two stages, the first being during the methylolation of the urea and the second being the methylolation of the thiourea.

An essential characteristic of the final product is that it be stable. "Stable" as the term is used herein may be defined as a product which is free from the formation of a precipitate, haze, or the shedding down of floc formation when allowed to stand at 25° C. for at least two weeks' time. Additionally, the resins according to the present invention must be sufficiently stable to be free from hydrophobing when diluted with up to 50 times its volume of water at 25° C.

Regardless of how the resin of the present invention is prepared, the combined formaldehyde should be from between about .5 to a theoretical maximum of 2 moles of formaldehyde per mole of urea and thiourea in the final reaction product. Preferably, the moles of combined formaldehyde should be from between about 1 to 2 moles per mole of urea-thiourea.

The degree of alkylation is limited in that one cannot alkylate any more formaldehyde than is combined. Thus, the maximum amount of combined alcohol present would be equivalent to the number of moles of combined formaldehyde in a given reaction product. A minimum amount of about .15 mole of alcohol per mole of total combined formaldehyde results in a suitable product, but from about .30 to about .70 mole of combined alcohol per mole of total combined formaldehyde is preferred.

The per cent of combined formaldehyde is taken as the difference between per cent total formaldehyde and per cent free formaldehyde. The per cent combined alcohol is taken as the difference between the per cent total alcohol and the per cent free alcohol. Methods for making such determinations are well known in the art and are not believed to require further elaboration herein. Suitable methods, for example, are disclosed in copending United States application, Serial No. 495,324, filed March 18, 1955, and Serial No. 568,705, filed March 1, 1956.

Resins produced according to the above-disclosed process are capable of imparting improved flame-retardant finishes to textile fabrics and in particular to nylon netting. In the instance of nylon nettings, such as Rachelle net, resins of the type prepared according to the present invention are applied thereto as by a pad bath, spraying, or other suitable means in amounts of from about 1% to 70% solids based on the weight of the cloth and preferably from between 50 and 65% solids based on the weight of the cloth. Thereafter, they are cured for 5 minutes at 250° F. to 5 seconds at 450° F. and preferably for from 90 seconds at 290° F. to 60 seconds at 350° F. to a water-insoluble state in the presence of acid curing catalyst such as ammonium bromide, ammonium chloride, certain mixed isopropanol amines and the like to impart excellent flame resistance. Such catalyst may be employed in amounts of between 0.50 and 1½%–10% based on the weight of resin solids and preferably in amounts from between 0.80 and 1%. Such nets treated with the resins of the present invention give a desirable stiff, springy, or resilient hand to the fabrics so treated.

The following examples are given primarily by way of illustration in order that the present invention may be more fully understood. No details therein should be construed as limitations on the present invention except as they appear in the appended claims. All parts and percentages are by weight unless otherwise designated.

*Example 1*

Into a suitable reaction vessel equipped with a thermometer, stirrer, reflux conditions and heating mantle 98 parts (3.5 moles) of methanol, 587 parts (7.23 moles) of 37% formalin (0.5% methanol), 603 parts (10.05 moles) of urea, 83 parts of $NaHSO_3$ (0.8 moles), and 9.0 milliliters of 50% triethanolamine were added. This mixture was heated to about 50° C. and 583 parts (17.71 moles) of 91% paraformaldehyde (9% water and traces of methanol), were added with constant stirring. The charge was heated to reflux (about 100° C.) in about ½ hour and then was refluxed for an additional half hour at a pH of 8.01. Thereafter, the pH was adjusted to about 3 with 28 milliliters of an 8.25% oxalic acid solution and further refluxed for 1 hour, after which the pH was adjusted to 7.3 by the addition of 6 milliliters of 50% triethanolamine.

The reaction mixture was cooled to 70° C. and 340 parts (10.6 moles) of methanol and 312 parts (4.11 moles) of thiourea were added. The temperature was adjusted to 50–55° C. and stirred for ½ hour at a pH of 7.2 to 7.5. The pH was then adjusted to about 5 with 45 milliliters of 8.25% oxalic acid solution and reacted for 1 hour at 50–55° C. The pH of the batch was adjusted to between 7.5 and 8 with 50% triethanolamine, cooled to between 30 and 40° C. at which time Hy-Flo (a filtering aid) was added and the batch was clarified through a pressure-type filter.

The clear filtrate was vacuum concentrated to 80% solids.

The stability of the product may be defined as (1) no hydrophobe formed when 1 part of the resin was diluted with 50 parts of water at 25° C. and (2) the appearance of the resin is water clear when allowed to stand for at least two weeks at 25° C. The mole ratio of urea to thiourea was 2.44:1. The mole ratio of $NaHSO_3$ to formaldehyde was 0.032. The amount of $NaHSO_3$ was 9.1% of the total weight of the urea plus the thiourea.

*Example 2*

The amount of reactants and the conditions as defined in Example 1 were maintained, except that the mole ratio of urea to thiourea was adjusted to 1.18:1 and the reaction mixture contained 23% thiourea.

*Example 3*

The reactants and conditions of Example 1 were maintained, except that the mole ratio of urea to thiourea was adjusted to 1.91:1 and the reacted product contained 17% thiourea.

Example 4

The reactions and conditions of Example 1 were maintained, except that the initial acid pH was 2.52 and the resin was concentrated to only 75% solids.

Example 5

The reactants and conditions of Example 1 were maintained, except that 2.7% $NaHSO_3$ based on the weight of the urea plus thiourea was added after the introduction of 37% formalin into the reaction vessel. This was equal to 0.01 mole of sodium bisulfite per mole of formaldehyde.

Example 6

The reactants and conditions of Example 1 were maintained, except that 5.5% sodium bisulfite based on the weight of the urea plus the thiourea was added after the introduction of formalin into the reaction vessel. This was equal to 0.02 mole of sodium bisulfite per mole of formaldehyde.

Example 7

Into a suitable reaction vessel 4180 parts (51.5 moles) of 37% formalin, 700 parts (21.9 moles) of methanol, 42 parts of triethanolamine, 3900 parts (65.0 moles) of urea are charged. The reaction mixture was heated up to 140° F. and 3900 parts (118.5 moles) of 91% paraformaldehyde, 640 parts (6.2 moles) of sodium bisulfite were added and the reaction mixture was heated to reflux, about 104° C. The reaction mixture was held at reflux for 30 minutes and 40 parts of oxalic acid, preferably dissolved in 160 parts (5.0 moles) of methanol, were added to adjust the pH of the reaction mixture to from 3.3 to 3.6.

The reaction mixture was refluxed continually for an additional 30 minutes and 70 parts of 10-N sodium hydroxide sufficient to adjust the pH to from between 7.0 and 7.5 were added. The reaction mixture was cooled to about 70° C. and 2270 parts (71.0 moles) of methanol and 2600 parts (34.2 moles) of thiourea were added to the reaction mixture. The temperature of the mixture was adjusted to about 52° C. and the pH was adjusted to from 7.0 to 7.5. This temperature was maintained for 30 minutes and thereafter the pH was adjusted downwardly to from between 4.8 to 5.2 with 19.4 parts of oxalic acid.

The temperature of the reaction mixture was held at about 52° C. for an additional hour and thereafter the pH of the mixture was adjusted to between 7.4 and 7.8 by the addition of 55 parts of 10-N sodium hydroxide. Thereafter, the reaction mixture was filtered and the filtrate vacuum concentrated to a syrup viscosity at 25° C. of between 1000 and 1200 cps. The bisulfite to aldehyde mole ratio was about 0.037:1.

As will be noted in Examples 1 and 7, it is sometimes desirable to add a suitable alcohol at the time of the initial reaction between the urea, aldehyde and bisulfite. If not added initially, it may be added when the above said reaction mixture is rendered acidic for purposes of polymerization. In either event, the presence of the alcohol at this stage of the process slows the rate of polymerization, and, in addition, some alkylation of the urea-formaldehyde condensate occurs. The ultimate effect of this procedure appears to be an increase in stability of the final product as in indicated by the comparative stability chart set forth hereinbelow.

Suitable alcohols are those discussed hereinabove, and may be added in amounts up to 10% by weight of the urea-aldehyde, bisulfite reaction mixture prior to polymerization. This is equivalent to a mole ratio of about 1:2 to 1:4, alcohol to urea, respectively. Preferably, amounts of between 2 and 6% are employed. When the amounts present are significantly in excess of 8%, greater alkylation than polymerization is encountered, which is undesirable at this stage of the process.

When alcohol is added to the urea-aldehyde bisulfite reaction mixture, subsequent amounts for alkylating the formaldehyde condensates of urea and thiourea are obviously smaller. The total amount of alcohol utilized should be equal to a mole ratio of from 3-4:1, alcohol to urea, respectively.

The table set forth hereinbelow is a record of stability of the urea-thiourea resins prepared according to Examples 1–7.

| Stability | 12° C. | 25° C. | 37° C. |
|---|---|---|---|
|  | Weeks | Weeks | Weeks |
| Example 1 | >10 | 9 | 5–6 |
| Example 2 | >5 | >5 | 3 |
| Example 3 | >3 | >3 | >3 |
| Example 4 | >6 | >6 | 2–3 |
| Example 5 | 8 | 3–4 | 1–2 |
| Example 6 | 8–10 | 4–5 | 1–2 |
| Example 7 | >16 | >12 | 4–6 |

Example 8

Eighty parts of the product made according to Example 2 was mixed with 0.96 part of $NH_4Cl$ and 19.04 parts of water. This solution was then applied to nylon Rachelle netting by conventional padding methods so that the wet pick-up was from between 80 and 100%. The padded fabric was then dried and cured in one operation by holding it in an oven at 310° F. for 1 minute. The treated net had a desirable, firm, resilient finish and was found to safely meet the standards described in the Flammable Fabrics Act (P. A. 88—83rd Congress), and after being both laundered and dry cleaned, whereas a similar piece of nylon netting treated with a conventional thermosetting textile resin (methylated methylol melamine) was classified as a fabric subject to rapid and intense burning.

Example 9

Eighty parts of a product made according to Example 3 was mixed with 0.96 part of ammonium chloride and 19.4 parts of water. The Rachelle net was then padded through this concentrated solution in a padder, having a squeeze roll adjustment for a 100% wet pick-up. The treated fabric was then put on a 10-inch pin frame using tension and thereafter placed in an oven maintained at 360° F. for 1.0 minute. The treated net had a desirable stiff and resilient finish and was found to safely meet the standards prescribed in the Flammable Fabrics Act, hereinabove referred to.

An important aspect of the process of the present invention relates to the limitation concerning the amount of bisulfite per mole of aldehyde. The operable range is from 0.01 to 0.040 mole of said bisulfite per mole of aldehyde and the preferred mole ratio is 0.030 to 0.038:1. It has been determined that resins prepared employing the above-identified mole ratio of bisulfite to aldehyde result in a stiffer, more resilient finish when properly applied to nylon netting. These findings were found to be true at several different conditions of cure. Since stiffness and resiliency are desirable characteristics for treated nylon netting, such as is employed in women's petticoats, net evening wear, and the like, these properties are extremely important. In addition, we have found that the use of bisulfite in the described mole ratio to formaldehyde produced a highly acceptable compromise between stability of the product on the one hand and the ability to produce a stiff, resilient finish on the other.

A second important aspect concerning the amount of bisulfite employed in the process of preparing the resins of the present invention relates to when such resins are cured on nylon netting. Where the mole ratio of bisulfite to formaldehyde exceeds the upper limit of 0.040:1, as for example, when the mole ratio is from 0.045:1 or even higher, the resin is more difficult to cure. In addition, under the same conditions of cure on nylon netting, a softer hand results than when resins having the bisulfite/aldehyde ratio of the present invention are employed. Furthermore, if an equivalent stiff hand is desired, more rigid conditions of cure must be employed. This results in undesirable discoloration, which destroys the saleability of white goods.

Another aspect of the process for preparing the resins of the present invention is the pH range at which the polymerization of the urea-formaldehyde and bisulfite reaction mixture or urea-formaldehyde, methanol and bisulfite reaction mixture occurs. This range is from between 2.2 to 3.8 and is preferably between 3 and 3.6. It is during this period of time and at this pH that the only appreciable amount of polymerization occurs. Applicants' product at this stage is being at least partially alkylated if an alcohol has been introduced into the reaction mixture. The presence of alcohol, which results in some alkylation, results in a product which has increased stability. This increases the difficulty of achieving the degree of polymerization necessary. Within this low pH range, this polymerization may be readily achieved in relatively short periods of time.

The products of the present invention are useful in fields wherein water-soluble urea and thiourea bisulfite modified aldehyde condensates are employed, including paper making, chemical intermediates and the like.

We claim:

1. A process for preparing a hydrophilic potentially thermosetting resinous product which comprises reacting at a temperature above 40° C. and at a pH of between 7 and 9 relative proportions of 1 mole of urea with between 2.0 and 6.5 moles of an aliphatic aldehyde in the presence of from between 0.01 and 0.040 mole of bisulfite per mole of aldehyde; polymerizing said reaction product at a pH of between 2.2 and 3.8 and at a temperature above 40° C., adjusting the pH of the reaction mixture to between 7 and 9, reacting from between 0.3 and 2.5 moles of thiourea with said reaction mixture, adjusting the pH of said reaction mixture to between 3.5 and 5.5, and alkylating the reaction product with from 0.3–4 moles of a saturated monohydric aliphatic alcohol containing 1–3 carbon atoms, and thereafter adjusting the pH to the alkaline side, whereby a hydrophilic stable resinous product is formed, said stable product being defined as one which does not shed down floc when maintained for two weeks at 25° C. and which does not hydrophobe when diluted with 50 times its volume of water at 25° C.

2. A process for preparing a hydrophilic potentially thermosetting resinous product which comprises reacting at a temperature above 40° C. and at a pH of between 7 and 9 relative proportions of 1 mole of urea with between 2.0 and 6.5 moles of an aliphatic aldehyde in the presence of from between 0.030 and 0.036 mole of bisulfite per mole of aldehyde; polymerizing said reaction product at a pH of between 3.0 and 3.6 and at a temperature above 40° C., adjusting the pH of the reaction mixture to between 7 and 9, reacting from between 0.3 and 2.5 moles of thiourea with said reaction mixture, adjusting the pH of said reaction mixture to between 3.5 and 5.5 and alkylating the reaction product with from 1–3 moles of a saturated monohydric aliphatic alcohol containing 1–3 carbon atoms, and thereafter adjusting the pH to the alkaline side, whereby a hydrophilic stable resinous product is formed, said stable product being defined as one which does not shed down floc when maintained for two weeks at 25° C. and which does not hydrophobe when diluted with 50 times its volume of water at 25° C.

3. A process for preparing a hydrophilic potentially thermosetting resinous product which comprises reacting at a temperature of between 40° C. and 105° C. and at a pH of between 8 and 8.5 relative proportions of 1 mole of urea with between 2.5 and 3.0 moles of an aliphatic aldehyde in the presence of from between 0.030 and 0.038 moles of bisulfite per mole of aldehyde; polymerizing said reaction product at a pH of between 3.0 and 3.60 and at a temperature above 40° C., adjusting the pH of the reaction mixture to between 7 and 8, reacting from between 0.3 and 2.5 moles of thiourea with said reaction mixture, adjusting the pH of said reaction mixture to between 4.8 and 5.2 and alkylating the reaction product with from 1–3 moles of a saturated monohydric aliphatic alcohol containing 1–3 carbon atoms, and thereafter adjusting the pH to the alkaline side, whereby a hydrophilic stable resinous product is formed, said stable product being defined as one which does not shed down floc when maintained for two weeks at 25° C. and which does not hydrophobe when diluted with 50 times its volume of water at 25° C.

4. A process for preparing a hydrophilic potentially thermosetting resinous product which comprises reacting at a temperature of between 95° C. and 105° C. and at a pH of between 8 and 8.5 relative proportions of 1 mole of urea with between 2.0 and 6.5 moles of an aliphatic aldehyde in the presence of from between 0.01 and 0.040 mole of bisulfite per mole of aldehyde; polymerizing said reaction product at a pH of between 2.2 and 3.8 and at a temperature between 95° C. and 105° C., adjusting the pH of the reaction mixture to between 7 and 8, cooling the reaction mixture to between 40° C. and 80° C., reacting from between 0.5 and 1 mole of thiourea with said reaction mixture, adjusting the pH of said reaction mixture to between 4.8 and 5.2 and the temperature to between 40° C. and 65° C., and alkylating the reaction product with from 0.3–4 moles of a saturated monohydric aliphatic alcohol containing 1–3 carbon atoms, and thereafter adjusting the pH to the alkaline side, whereby a hydrophilic stable resinous product is formed, said stable product being defined as one which does not shed down floc when maintained for two weeks at 25° C. and which does not hydrophobe when diluted with 50 times its volume of water at 25° C.

5. A process for preparing a hydrophilic potentially thermosetting resinous product which comprises reacting at a temperature above 40° C. and at a pH of between 7 and 9 relative proportions of 1 mole of urea with between 2.0 and 6.5 moles of an aliphatic aldehyde in the presence of from between 0.01 and 0.040 mole of bisulfite per mole of aldehyde; polymerizing said reaction product at a pH of between 2.2 and 3.8 and at a temperature above 40° C., adjusting the pH of the reaction mixture to between 7 and 9, cooling the reaction mixture to between 60° C. and 70° C., reacting from between 0.3 and 2.5 moles of thiourea with said reaction mixture, adjusting the pH of said reaction mixture to between 3.5 and 5.5 and the temperature to between 45° C. and 55° C., and alkylating the reaction product with from 0.3–4 moles of a saturated monohydric aliphatic alcohol containing 1–3 carbon atoms, and thereafter adjusting the pH to between 7.5 and 8.5, whereby a hydrophilic stable resinous product is formed, said stable product being defined as one which does not shed down floc when maintained for two weeks at 25° C., and which does not hydrophobe when diluted with 50 times its volume of water at 25° C.

6. A process for preparing a hydrophilic potentially thermosetting resinous product which comprises reacting at a temperature above 40° C. and at a pH of between 7 and 9 relative proportions of 1 mole of urea with between 2.0 and 6.5 moles of formaldehyde in the presence of from between 0.01 and 0.040 mole of sodium bisulfite per mole of formaldehyde, polymerizing said reaction product at a pH of between 2.2 and 3.8 and at a temperature above 40° C., adjusting the pH of the reaction mixture to between 7 and 9, reacting from between 0.3 and 2.5 moles of thiourea with said reaction mixture, adjusting the pH of said reaction mixture to between 3.5 and 5.5, and alkylating the reaction product with from 0.3–4 moles of a saturated monohydric aliphatic alcohol containing 1–3 carbon atoms, and thereafter adjusting the pH to the alkaline side, whereby a hydrophilic stable resinous product is formed, said stable product being defined as one which does not shed down floc when maintained for two weeks at 25° C. and which does not hydrophobe when diluted with 50 times its volume of water at 25° C.

7. A process according to claim 6 wherein the aldehyde is formaldehyde and the saturated aliphatic alcohol is methanol.

8. A process according to claim 6 wherein the saturated aliphatic alcohol is ethanol.

9. A process according to claim 6 wherein the saturated aliphatic alcohol is propyl alcohol.

10. A process for preparing a hydrophilic potentially thermosetting resinous product which comprises reacting at a temperature above 40° C. and at a pH of between 7 and 9 for from 20 minutes to 2 hours relative proportions of 1 mole of urea with between 2.0 and 6.5 moles of an aliphatic aldehyde in the presence of from between 0.01 and 0.040 mole of bisulfite per mole of aldehyde; polymerizing said reaction product for from 10 minutes to 2 hours at a pH of between 2.2 and 3.8, adjusting the pH of the reaction mixture to between 7 and 9, reacting from between 0.3 and 2.5 moles of thiourea with said reaction mixture for from 20 minutes to 2 hours, adjusting the pH of said reaction mixture to between 3.5 and 5.5 and alkylating the reaction product with from 0.3 to 4 moles of a saturated monohydric aliphatic alcohol containing 1–3 carbon atoms for from 20 minutes to 2 hours, and thereafter adjusting the pH of the reaction mixture to the alkaline side, whereby a stable hydrophilic resinous product is formed, said stable product being defined as one which does not shed down floc when maintained for two weeks at 25° C. and which does not hydrophobe when diluted with 50 times its volume of water at 25° C.

11. A process for preparing a hydrophilic potentially thermosetting resinous product which comprises reacting at a temperature above 40° C. and at a pH of between 7 and 9 for from 45 minutes to 75 minutes relative proportions of 1 mole of urea with between 2.0 and 6.5 moles of an aliphatic aldehyde in the presence of from between 0.01 and 0.040 mole of bisulfite per mole of aldehyde, polymerizing said reaction product for from 20 minutes to 75 minutes at a pH of between 2.2 and 3.8, adjusting the pH of the reaction mixture to between 7 and 9, and reacting from between 0.3 and 2.5 moles of thiourea with said reaction mixture for from about 30 minutes to 75 minutes, adjusting the pH of said reaction mixture to between 3.5 and 5.5 and alkylating the reaction product with from 0.3 to 4 moles of a saturated monohydric aliphatic alcohol containing 1–3 carbon atoms for from 45 minutes to 75 minutes, and thereafter adjusting the pH of the reaction mixture to the alkaline side, whereby a hydrophilic stable resinous product is formed, said stable product being defined as one which does not shed down floc when maintained for two weeks at 25° C. and which does not hydrophobe when diluted with 50 times its volume of water at 25° C.

12. A hydrophilic potentially thermosetting resin produced according to the process of claim 1.

13. A hydrophilic potentially thermosetting resin produced according to the process of claim 7.

14. A hydrophilic potentially thermosetting resin produced according to the process of claim 10.

15. A process for treating textile fabric comprising treating said fabric with amounts of from between about 1% and 70% resin solids produced according to claim 1 and thereafter curing said resin for from 5 minutes at 250° F. to 5 seconds at 450° F. to a water-insoluble state in the presence of an acid catalyst.

16. A process for treating nylon to impart flame resistance thereto comprising treating said nylon with amounts of from between 50 and 65% resin solids produced according to the process of claim 1 and thereafter curing said resin for from 90 seconds at 290° F. to 60 seconds at 350° F. to a water-insoluble state in the presence of from between 0.50 and 10% of catalyst based on the weight of resin solids.

17. A process for treating nylon to impart flame resistance thereto comprising treating said nylon with amounts of from between 50 and 65% resin solids produced according to the process of claim 1 and thereafter curing said resin for from 90 seconds at 290 F. to 60 seconds at 350° F. to a water-insoluble state in the presence of from between 0.50 and 10% of an acid catalyst based on the weight of resin solids.

18. A process according to claim 1 in which the aliphatic aldehyde is formaldehyde.

References Cited in the file of this patent

UNITED STATES PATENTS

| | | |
|---|---|---|
| 2,407,599 | Auten et al. | Sept. 10, 1946 |
| 2,681,326 | Christianson | June 15, 1954 |